Jan. 24, 1967  C. R. GRAGE  3,299,877
APPARATUS FOR CUTTING CYLINDRICAL BLOCKS OF STONE
Filed Aug. 24, 1964  3 Sheets-Sheet 1
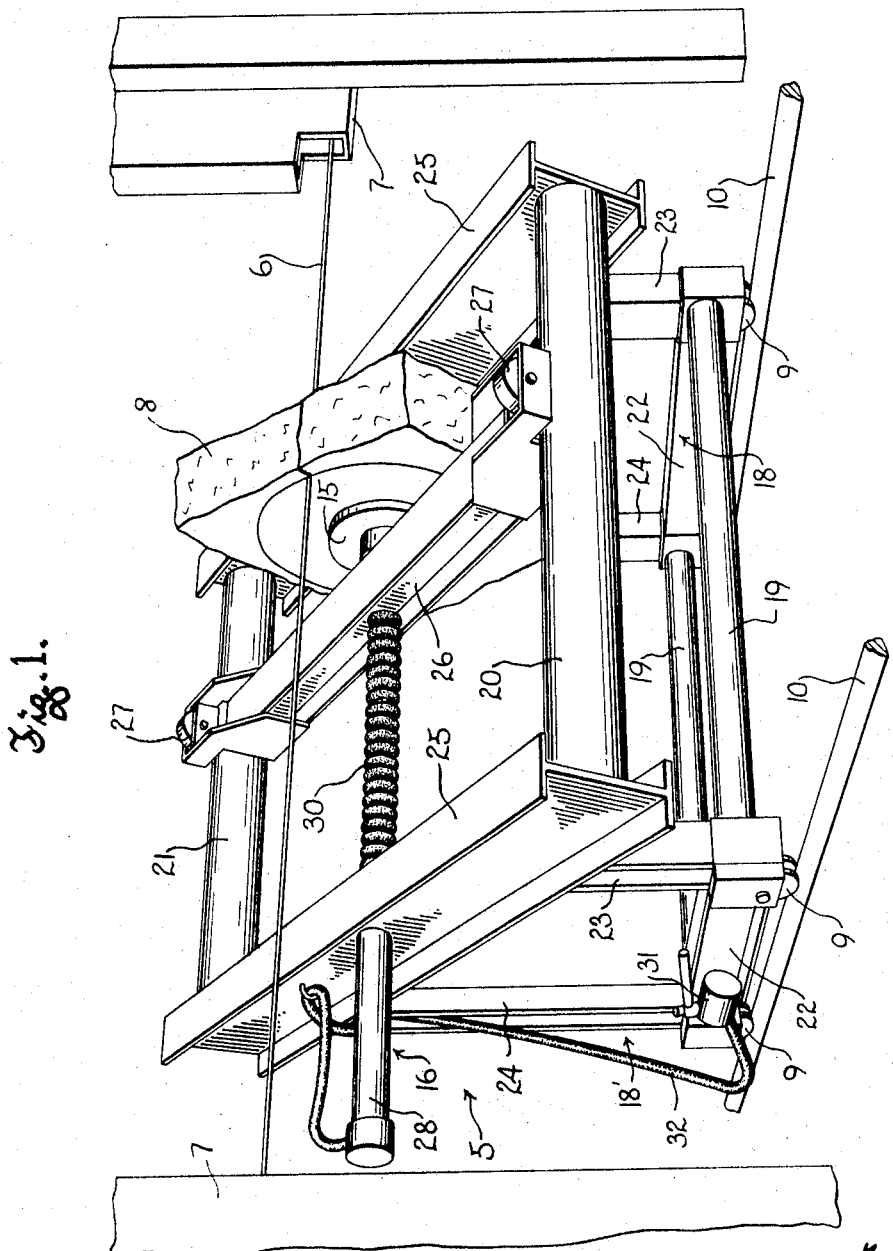
Inventor
Casper R. Grage

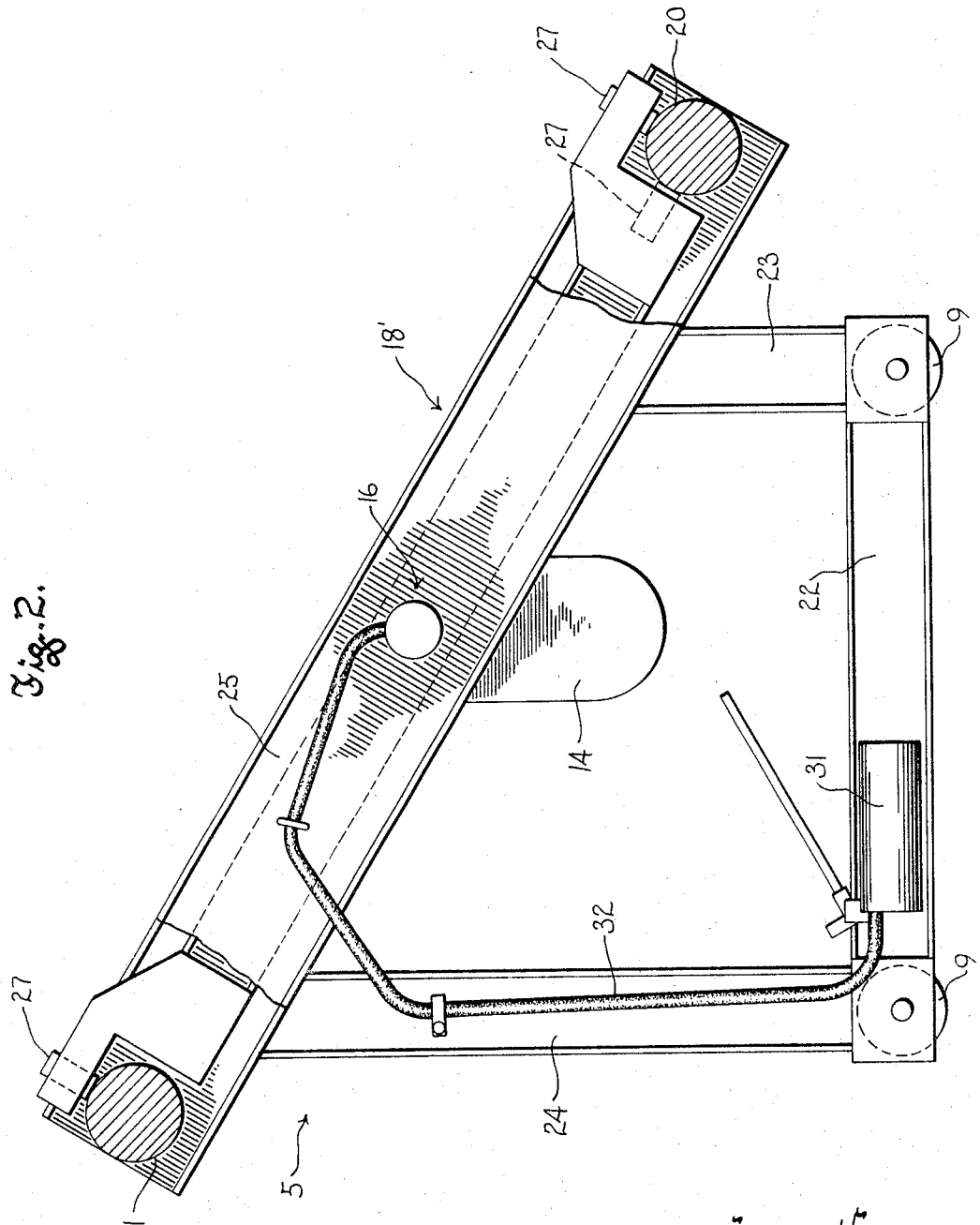

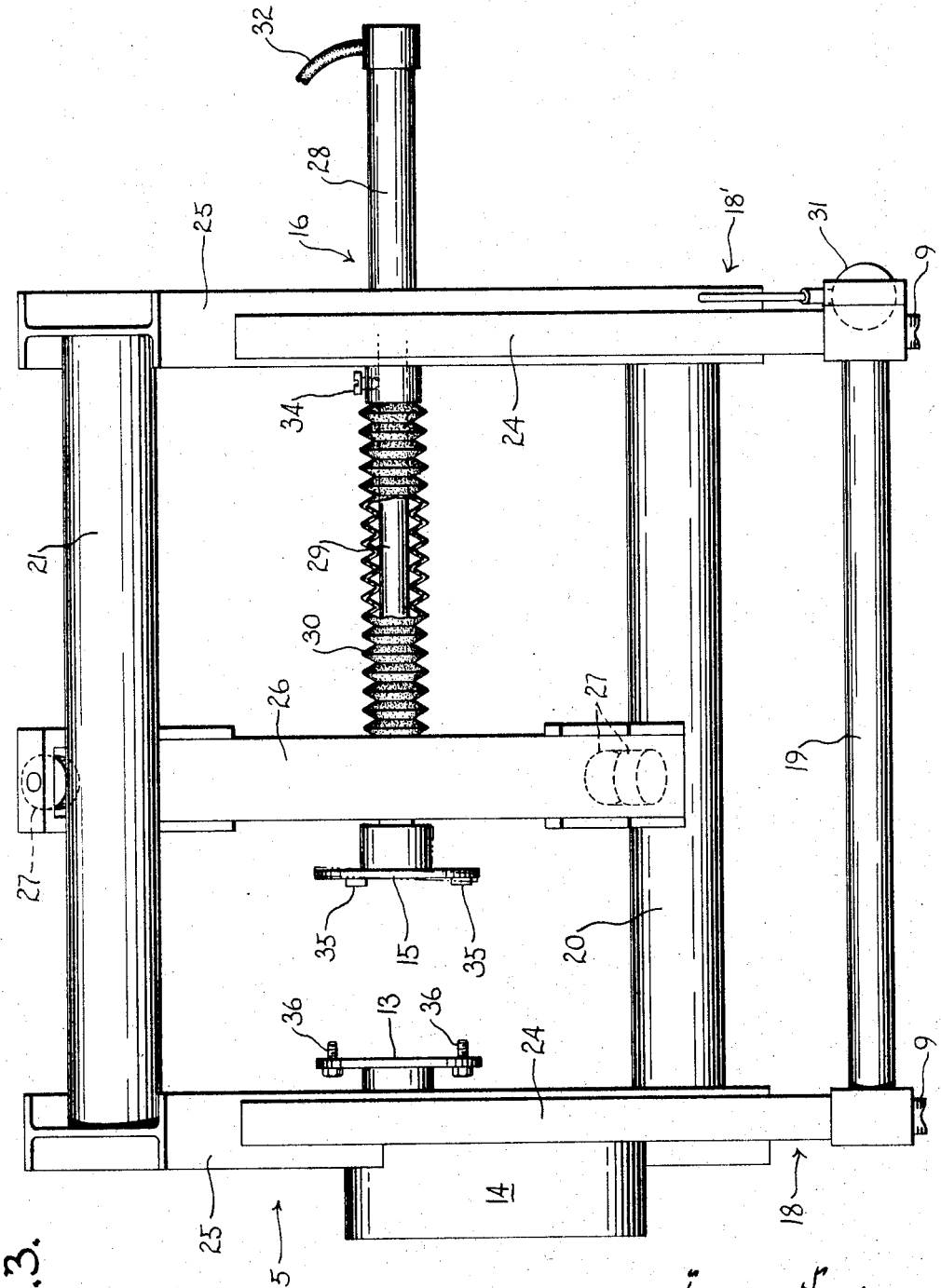

United States Patent Office 3,299,877
Patented Jan. 24, 1967

3,299,877
APPARATUS FOR CUTTING CYLINDRICAL
BLOCKS OF STONE
Casper R. Grage, Escondido, Calif., assignor to Continental Granite Corp., Escondido, Calif., a corporation of California
Filed Aug. 24, 1964, Ser. No. 391,504
3 Claims. (Cl. 125—21)

This invention relates to machinery for sawing stone by means of an abrasive wire or cable, and refers more particularly to apparatus for cutting stone workpieces into cylindrical blocks or circular slabs by means of an endless flexible wire or cable having a horizontal cutting stretch.

Abrasive wire stone-sawing machines are well known and widely used in the stone working industry, and many of them are arranged to have a straight horizontal cutting stretch. Heretofore, however, no apparatus has been available for adapting a stone saw of the horizontal cutting stretch type to the production of cylindrical blocks and circular slabs of stone.

It is an object of the present invention to provide simple and rugged apparatus in the nature of an accessory for a stone saw having an abrasive wire cutting element with a horizontal cutting stretch, which apparatus adapts such a stone saw for the production of cylindrical blocks of stone having any of a wide range of radial and axial sizes.

More specifically, it is an object of the present invention to provide a device of the character described which is cooperable with an abrasive wire stone saw having a horizontal cutting stretch and by which a stone workpiece can be presented to the cutting stretch and, while being cut, can be slowly rotated about a fixed axis which is parallel to the cutting stretch for production of a cylindrical block or circular slab.

Another object of the present invention is to provide apparatus of the character described whereby a block of stone having opposite substantially flat and parallel faces can be securely held for rotation about a horizontal axis while being presented to a horizontal cutting stretch of an abrasive wire stone saw.

A further object of this invention is to provide apparatus of the character described which is readily adjustable to accommodate workpieces of different sizes.

With the above and other objects in view which will appear as the description proceeds, this invention resides in a novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates one complete example of a physical embodiment of the invention constructed according to the best mode so far devised for the practical application of the principles thereof, and in which:

FIGURE 1 is a perspective view of the apparatus of this invention shown in operative relationship to a horizontal cutting stretch of an abrasive wire cutting element;

FIGURE 2 is a view in side elevation, but with portions broken away, of the apparatus shown in FIGURE 1; and FIGURE 3 is a rear elevational view of the apparatus, with a portion cut away.

Referring now more particularly to the accompanying drawings, the numeral 5 designates generally the apparatus of this invention, which is adapted to present a block or slab of stone to be cut to a straight horizontal stretch 6 of an endless abrasive wire cutting element of known type. Details of stone sawing machines having such cutting elements are well known in the art, and therefore other parts of the sawing machine are not shown. Suffice it to say that the endless cutting element is trained around pulleys in a large loop that includes the cutting stretch 6, and one of the pulleys is power driven to move the cutting element lengthwise. At opposite ends of the cutting stretch the cutting element passes through guides 7 which confine the wire against lateral displacement in response to cutting reaction forces thereon. Provision may be made for coating the cutting element with an abrasive material as it enters the cutting stretch.

By means of the apparatus 5 of this invention a workpiece 8, consisting of a block or slab of stone having reasonably flat and parallel opposite faces, is presented to the cutting stretch of the wire and is slowly rotated about an axis which is parallel to the cutting stretch and spaced therefrom, so that as a result of such rotation of the workpiece the cutting element cuts a cylindrical block or circular slab from the workpiece.

The apparatus 5 comprises a carriage having flanged wheels 9 by which the apparatus is carried for movement along a pair of tracks 10 which extend transversely to the cutting stretch of the wire and which are adapted to carry other types of apparatus whereby various workpieces can be presented to the cutting stretch to be cut into different configurations, according to known uses of machines of this type. The tracks extend to a loading station, not shown, where workpieces to be cut are loaded into the machine and finished pieces are removed therefrom. The apparatus can be moved along the tracks either manually or by means of a winch.

On the frame of the carriage, described hereinafter, there are mounted a rotatable drivehead 13, a power means 14 for rotating the drivehead, a tailstock 15, and a hydraulic jack 16 for forcefully moving the tailstock toward the drivehead. Thus a workpiece 8 to be cut can be confined between the drivehead 13 and the tailstock 15, under clamping force exerted by the hydraulic jack 16, and can be slowly rotated by the power means 14 while the abrasive wire acts upon it.

The carriage comprises a pair of upright side members 18 and 18', one at each side of the carriage, each disposed in a vertical plane that is normal to the cutting stretch of the wire. The two side members are held in laterally spaced apart relationship by lower transverse members 19 and by front and rear rails 20 and 21.

Each of the side members comprises a fore-and-aft extending beam 22 at the bottom of the carriage, a short column 23 projecting upwardly from the front end of the beam 22 and a longer column 24 projecting upwardly from its rear end, and an inclined beam 25 which spans the tops of the columns 23 and 24. The lower transverse members 19 connect the front and rear ends, respectively, of the fore-and-aft extending beams 22 to cooperate with them in defining a rectangular horizontal subframe having the wheels 9 at its corners.

Attention is directed to the fact that the inclined beams 25 are parallel and opposite one another, and are so disposed that the upper edge of each is substantially below the level of the cutting stretch at its front end and substantially above that level at its rear end.

The front rail 20 bridges the lower end portions of the two inclined beams 25, while the rear rail 21 bridges their upper end portions. The rails 20 and 21, which are preferably cylindrical, have their axes parallel to the cutting stretch 6 and cooperate in guidingly supporting a movable elongated tailstock carrier 26. The tailstock carrier is essentially a beam member which extends between the rails 20 and 21 and which has freely rotatable supporting rollers 27 at its opposite ends that track upon the rails to support and guide the carrier for translatory motion between the side members 18 and 18'.

The drivehead 13 is mounted on one of the side members 18, and specifically on the inclined beam portion 25 thereof. It comprises a face plate or disc, at the inner side of the side member, facing the tailstock carrier, and is of course rotatable on an axis which is parallel to the rails 20 and 21 and midway between them. The power means 14 for the drivehead, which can comprise a suitable motor and transmission means, is mounted on the side member 18, at the outer side thereof.

The tailstock 15, which can comprise a disc generally similar to the drivehead, is mounted on the tailstock carrier 26, at the side thereof facing the drivehead, for free rotation on an axis coinciding with that of the drivehead.

The hydraulic jack 16, by which the tailstock can be forced toward the drivehead, is fixed to the other side member 18', in alignment with the axes of the drivehead and tailstock. Preferably the jack has its cylinder 28 fixed in a bore through the inclined beam 25 and welded or otherwise secured thereto to be held against axial displacement, with most of the length of the cylinder extending outwardly from the side member 18'. The ram 29 of the hydraulic jack, which engages the tailstock carrier 26 to exert its thrust thereon, is preferably protected from abrasive dust by means of a bellows-like boot 30 of rubber or the like. A hand pump 31, mounted on the side member 18' beneath the inclined beam and connected with the hydraulic jack by a flexible duct 32, provides a source of hydraulic pressure fluid for the jack.

A stone workpiece to be cut can be confined between the tailstock and the drivehead under substantial clamping force produced by the hydraulic jack, and to insure that such force will not be relaxed while the stone is being cut the jack is provided with a locking screw 34 that is threaded through its cylinder, near the inner end thereof, and engages its ram.

To accommodate slight lack of parallelism between the opposite faces of a workpiece, the tailstock plate is preferably mounted in a known manner to permit it a limited degree of swiveling motion; and it has three axially projecting pads 35 on its face which accommodate any departure from flatness in the workpiece surface that it is engaging. To insure that the workpiece will not slide or turn relative to the drivehead plate, the latter is provided with a circle of holes which are adapted to receive bolts 36 engageable in suitable threaded sockets (not shown) that are inserted into the adjacent face of the workpiece and held in place by epoxy cement or the like.

When a workpiece is firmly secured between the drivehead and the tailstock, with the bolts 36 in place and the tailstock clampingly engaged with the workpiece under the force of the hydraulic jack and locked in that condition by tightening of the locking screw 34, the carriage is moved along the rails 10 until the workpiece engages the cutting stretch of the wire. The carriage is then slowly advanced along the rails until the wire has cut into the workpiece to the circular line upon which the finished cylindrical block is to be cut, whereupon movement of the carriage is stopped and the drive mechanism is started to begin slow rotation of the workpiece about the axis of the drivehead and tailstock.

It will be observed that because of the inclination of the upper edges of side members 18 and 18', the carriage structure does not interfere with the cutting stretch, and the radius of the drivehead plate defines the minimum radius to which stone workpieces can be cut.

From the foregoing description taken together with the accompanying drawings it will be apparent that this invention provides apparatus for cutting stone workpieces into cylindrical blocks or circular slabs by means of an abrasive wire stone saw having a horizontal cutting stretch, which apparatus can accommodate workpieces of a wide range of shapes and sizes, is easily loaded and unloaded, and is accurate and dependable in operation.

What is claimed as my invention is:

1. Apparatus for cutting slabs of stone into cylindrical blocks by means of a driven endless flexible sawing wire having a horizontal cutting stretch, said apparatus comprising:
   (A) a carriage mounted for horizontal motion in opposite directions transverse to said cutting stretch of the wire;
   (B) a pair of opposite upright side members on said carriage disposed in spaced apart planes normal to said cutting stretch, said side members having their upper edges inclined forwardly and downwardly and substantially above the level of the cutting stretch at the rear of the carriage and below said level at the front of the carriage;
   (C) a pair of rails carried by and spanning said side members near their upper edges and extending parallel to the cutting stretch of the wire, one of said rails being near the front of the carriage and the other near its rear;
   (D) a tailstock carrier;
   (E) means mounting said tailstock carrier on the rails for translatory motion along the rails;
   (F) a driving head on one of said pair of side members, at the side thereof facing the tailstock carrier, said driving head being rotatable on a fixed axis intermediate the rails and parallel to them;
   (G) power drive means on the carriage for rotatably driving said driving head;
   (H) a tailstock mounted on the tailstock carrier, at the side thereof facing the driving head, and constrained to translatory motion with the tailstock carrier and to rotation on an axis coinciding with that of the driving head; and
   (I) force exerting means reacting between the other side member and the tailstock carrier for exerting force against the tailstock carrier in the direction to urge it toward the driving head, so that a slab of stone to be cut can be clampingly confined between the driving head and the tailstock for rotation with the driving head.

2. Apparatus for cutting stone workpieces into circular blocks by means of a driven endless flexible sawing wire having a horizontal cutting stretch, said apparatus comprising:
   (A) carriage means mounted for horizontal motion in opposite directions transverse to said cutting stretch of the wire;
   (B) a pair of elongated guide rails;
   (C) means mounting said rails on the carriage for motion therewith, with the rails extending parallel to the cutting stretch of the wire and with one rail spaced above the level of the cutting stretch and the other rail spaced below said level;
   (D) a tailstock carrier bridging said rails and jointly supported by them for motion along them in opposite directions;
   (E) a tailstock rotatably mounted on the tailstock carrier and facing in one direction of motion of the tailstock carrier, said tailstock being rotatable about an axis parallel to and intermediate the rails and being constrained to translatory motion with the carrier;
   (F) a rotatable drivehead;
   (G) means mounting the drivehead on the carriage with the drivehead facing the tailstock, said means constraining the drivehead to rotation on a fixed axis coinciding with that of the tailstock;
   (H) means on the carriage for rotating the drivehead; and
   (I) force exerting means reacting between the tailstock carrier and a part fixed on the carriage for moving the carrier in the direction toward the dirvehead and for exerting force upon the carrier in said direction whereby a slab of stone to be cut can be clampingly confined between the tailstock and the drivehead for rotation with the latter.

3. In stone sawing apparatus having a driven endless flexible sawing wire with a straight horizontal stretch, a pair of horizontal tracks extending transversely to said stretch of the cutting wire, and a carriage mounted on the tracks for motion therealong and by which a piece of stone to be cut can be carried to and from engagement with said stretch of the cutting wire, means on the carriage for rotating a piece of stone about an axis parallel to said stretch while the piece is engaged with the cutting wire so that the piece can be cut into a cylindrical block, said means comprising:

(A) a pair of elongated beam-like frame members extending along opposite sides of the carriage and disposed in spaced apart vertical planes normal to said stretch of the cutting wire, said frame members being parallel to one another and inclined to the horizontal with their front ends at a level below that of said stretch and their rear ends at a level above that of said stretch;

(B) a pair of elongated rails carried by said frame members, one of said rails having its opposite ends fixed to the rear ends of said frame members and the other having its opposite ends fixed to their front ends, and said rails being parallel to said stretch of the wire;

(C) a beam-like tailstock carrier;

(D) roller means on the opposite end portions of the tailstock carrier cooperating with the rails to mount the tailstock carrier substantially parallel with the frame members and between them, and for translatory motion along the rails;

(E) a tailstock mounted on the side of the tailstock carrier facing one of the frame members and constrained to movement with the carrier and to rotation on an axis intermediate and parallel to the rails;

(F) a drive plate on said one of said frame members, at the side thereof facing the carrier, constrained to rotation on an axis coinciding with that of the tailstock;

(G) drive means on the carriage for rotatably driving the drive plate; and (H) force applying means reacting between the other of the frame members and the tailstock carrier for urging the latter toward the first designated frame member with a force by which a piece of stone can be clampingly confined between the drive plate and the tailstock for rotation by the drive plate.

References Cited by the Examiner

UNITED STATES PATENTS

| | | | |
|---|---|---|---|
| 1,017,207 | 2/1912 | Eggers | 125—21 |
| 2,803,239 | 8/1957 | D'Auaucourt | 125—21 |

HAROLD D. WHITEHEAD, *Primary Examiner.*